United States Patent Office 2,701,104
Patented Feb. 1, 1955

2,701,104

METHOD OF PREPARING MANGANESE DIOXIDE FOR THE DEPOLARIZATION OF DRY CELLS

Abraham L. Fox, Washington, D. C., assignor to Reginald S. Dean, Hyattsville, Md.

No Drawing. Application January 25, 1952,
Serial No. 268,336

1 Claim. (Cl. 241—3)

This invention relates to improvements in manganese dioxide for the depolarization of dry cells, and this application is a continuation in part of my application Serial No. 66,140 filed December 18, 1948, now abandoned.

In my co-pending application, Serial No. 65,540, December 15, 1948, now patent 2,608,466, I have disclosed manganese dioxide of unusually high electrical conductivity. The present invention relates to further improvements in the electrical conductivity and density of manganese dioxide and particularly to the use of such improved manganese dioxide as a constituent of depolarizers for Leclanché cells.

I have found that when manganese dioxide is heated under pressure, the density and electrical conductivity are substantially increased and the depolarizing properties also substantially improved. The improvement is particularly significant when the process of my invention is applied to manganese dioxide of relatively low electrical resistance, it is effective, however, on all synthetic manganese dioxide. The temperature and pressure necessary to produce the improvement vary within fairly wide limits. The temperature limits are 400° F. to 700° F. and the pressure may vary from 20,000 pounds per square inch to 80,000 pounds.

In my co-pending application, Serial 165,581, filed June 1, 1950, now abandoned, I have disclosed that certain kinds of synthetic manganese dioxide when made into pellets in this way and such pellets or fragments thereof of larger than the usual particle size for battery oxide mixed with carbon that greatly improved depolarizers are formed.

I have found that all synthetic manganese dioxide are of particle size less than 10 microns ave. diameter is improved as a constituent of conventional depolarizing mixtures for Leclanché cells when it is pelletized in accordance with my invention and then comminuted to fine size, that is, through 200 mesh, but not to the original particle size. The original fine particle size may be the result of the method of production, or may result from comminution.

The following examples are given as illustrative of my invention:

EXAMPLE 1

I take two grams of manganese dioxide made by heating crystalline manganese carbonate of about 2 microns' average crystal diameter in air at a temperature of 540° F. for 24 hours, washing the dioxide with 10% sulphuric acid and then with water, filtering and drying the solid. The particle size of the dioxide was 2 microns average diameter. This manganese dioxide is placed in a steel die having a diameter of .605 of an inch. Pressure is applied for several minutes by a hydraulic press after both die and material were heated to an elevated temperature. Pressures varying from 20,000 p. s. i. to 80,000 p. s. i. were applied at temperatures varying from 400° to 700° F. The specific resistance in terms of ohms per cm. of the resulting pellets and their density are shown in the following table:

Table 1

[Pressure 60,000 lbs./sq. in.]

| Temperature (F.) | Specific Resistance, ohms per cmm. cube at 20° C. | Density |
| --- | --- | --- |
| 400° | 197 | 2.32 |
| 600° | 126 | 2.40 |
| 700° | 110 | 2.48 |

[Temperature 600° F.]

| Pressure (p. s. i.) | Specific Resistance, ohms per cmm. cube at 20° C. | Density |
| --- | --- | --- |
| 20,000 | 338 | 2.0 |
| 40,000 | 117 | 2.1 |
| 60,000 | 126 | 2.4 |
| 80,000 | 110 | 2.5 |

For comparison pellets formed in the same way at 60,000 lbs./sq. in. and room temperature showed a resistance of 3,000 and a density of 1.87. Heating these pellets to 600° F. after pressing did not alter their resistance or density.

The pellets made in this way were comminuted and used to prepare identical Leclanché cells. A sample of the original dioxide was likewise tested for comparison. The results of these tests follow:

| Conditions of Preparation of Pellet | Degree of Comminution | Capacity Hours to 0.9 v. |
| --- | --- | --- |
| Original Oxide | 2 microns, Ave. Dia | 107 |
| 60,000 p. s. i., 600° F | −200 mesh | 120 |
| 60,000 p. s. i., 600° F | 2 microns, Ave. Dia | 106 |
| 60,000 p. s. i., 400° F | −200 mesh | 117 |
| 60,000 p. s. i., 700° F | −200 mesh | 115 |

Pellets made at temperatures and pressures outside the range of 400–700° F. and 20,000 to 80,000 p. s. i. do not give cell capacities of more than the original oxide.

EXAMPLE II

I take a synthetic oxide made electrolytically and having an average particle size of 5 microns' diameter. I press this material into pellets at 60° F. and 30,000 p. s. i., leaving the pressure applied for only a few seconds. I comminute these pellets to an average particle size of 8 microns' diameter. Made into identical Leclanché cells, the cells made from pressed and comminuted material showed a capacity of 158 hours as compared to 131 for the original oxide.

EXAMPLE III

I take a synthetic manganese dioxide made by the oxidation of manganous hydroxide in ammoniacal solution. Such manganese dioxide is amorphous, the particle size being less than 0.1 micron average diameter. I press this material at 600° F. and 60,000 p. s. i. I comminute the pellets to such a size that the particles all pass a standard sieve having 200 meshes to the linear inch. Made into identical Lechanché cells the unpressed and pressed and comminuted oxide showed cell capacities of 28 and 75 hours respectively.

The electrical resistance of the pellets pressed at 600° F. and 60,000 p. s. i. was 900 ohms. Identical pellets pressed at room temperature and 60,000 p. s. i. had a resistance of 3,000 ohms.

What is claimed is:

The method of improving the depolarizing properties of synthetic manganese dioxide having a particle size of less than 10 microns' average diameter which includes the steps of compressing it in a die at a temperature of 400–700° F. and a pressure of 20,000–80,000 p. s. i. and comminuting the resulting body to a particle size that will pass a standard sieve having 200 meshes to the linear inch but larger than the original particle size.

References Cited in the file of this patent

UNITED STATES PATENTS

| | | |
|---|---|---|
| 887,123 | Rice | May 12, 1908 |
| 1,157,530 | Harper | Oct. 19, 1915 |
| 1,296,188 | Huth | Mar. 4, 1919 |
| 1,385,151 | Ruhoff | July 19, 1921 |
| 1,489,830 | Illingworth | Apr. 8, 1924 |
| 2,186,929 | Rossetti | Jan. 9, 1940 |

OTHER REFERENCES

Mellor: "A Comprehensive Treatise on Inorganic and Theoretical Chemistry," Longmans, Green & Co., New York, 1932, vol. XII, page 250. Copy in Div. 59.

McGurdie: "Study of the Modifications of Manganese Dioxide," U. S. Dept. of Commerce, Nat'l. Bureau of Standards, P. R. 1941, vol. 41, December 1948, pp. 589–600.